US008697221B2

(12) United States Patent
Han et al.

(10) Patent No.: US 8,697,221 B2
(45) Date of Patent: Apr. 15, 2014

(54) PLASTIC COMPOSITE PANEL WITH THE APPEARANCE AND TEXTURE SIMILAR TO NATURAL LUMBERS

(75) Inventors: Yousoo Han, Daejeon (KR); Seongchan Park, Cheongju-si (KR); Jungil Son, Gunpo-si (KR); Dongjin Kim, Daejeon (KR); Sangho Han, Cheongju-si (KR); Yunhwan Hwang, Seoul (KR)

(73) Assignee: LG Chem, Ltd., Seoul (KR)

( * ) Notice: Subject to any disclaimer, the term of this patent is extended or adjusted under 35 U.S.C. 154(b) by 413 days.

(21) Appl. No.: 12/085,569

(22) PCT Filed: Nov. 20, 2006

(86) PCT No.: PCT/KR2006/004870
§ 371 (c)(1), (2), (4) Date: Nov. 13, 2008

(87) PCT Pub. No.: WO2007/061201
PCT Pub. Date: May 31, 2007

(65) Prior Publication Data

US 2009/0098332 A1 Apr. 16, 2009

(30) Foreign Application Priority Data

Nov. 28, 2005 (KR) ........................ 10-2005-0114261

(51) Int. Cl.
*B32B 5/12* (2006.01)
*B32B 3/00* (2006.01)

(52) U.S. Cl.
USPC ............................ 428/114; 428/113; 428/156

(58) Field of Classification Search
USPC .................... 523/219; 428/106, 156; 156/279
See application file for complete search history.

(56) References Cited

U.S. PATENT DOCUMENTS

| | | | | |
|---|---|---|---|---|
| 2,846,801 | A | 8/1958 | Brown | |
| 2,890,493 | A | 6/1959 | Clark | |
| 4,076,566 | A * | 2/1978 | Power | 156/153 |
| 4,710,333 | A | 12/1987 | Murakami et al. | |
| 5,219,627 | A | 6/1993 | Arase et al. | |
| 5,489,460 | A | 2/1996 | Clarke et al. | |

(Continued)

FOREIGN PATENT DOCUMENTS

| | | |
|---|---|---|
| JP | 54-064552 | 5/1979 |
| JP | 07-108511 | 4/1995 |
| JP | 08-224796 | 9/1996 |
| JP | 9-39008 | 2/1997 |
| JP | 09-039008 | 2/1997 |

(Continued)

*Primary Examiner* — Gwendolyn Blackwell
*Assistant Examiner* — Anthony J Frost
(74) *Attorney, Agent, or Firm* — McKenna Long & Aldridge LLP

(57) ABSTRACT

Disclosed herein is a wood plastic composite panel made of a resin composite in which wood fiber having a size of 80 to 300 meshes is included in a synthetic resin matrix, the wood plastic composite panel being provided at the entire surface thereof with an embossed structure of a lumber cut-open pattern having an average depth of 200 to 900 μm and a linear micro concavo-convex structure having an average depth of 10 to 500 μm, the panel having a reflection rate of 10 to 50% when light is incident on the surface of the panel at an incidence angle of 60 degrees. The wood plastic composite panel according to the present invention has excellent strength and durability. Furthermore, the wood plastic composite panel according to the present invention exhibits excellent appearance and texture comparable with cut-open surfaces of natural lumbers although the panel has a surface structure different from the cut-open surfaces of the natural lumbers.

7 Claims, 5 Drawing Sheets

(56) References Cited

U.S. PATENT DOCUMENTS

| | | | | | |
|---|---|---|---|---|---|
| 5,866,641 | A * | 2/1999 | Ronden et al. | ................ | 523/219 |
| 6,153,293 | A | 11/2000 | Dahl et al. | | |
| 2002/0050215 | A1* | 5/2002 | King | ................................ | 101/41 |
| 2004/0131828 | A1 | 7/2004 | Edgman | | |
| 2004/0139673 | A1* | 7/2004 | Luetgert et al. | ................. | 52/313 |

FOREIGN PATENT DOCUMENTS

| | | | |
|---|---|---|---|
| JP | 11-62414 | | 3/1999 |
| JP | 11-062414 | | 3/1999 |
| KR | 10-20020081404 | A | 10/2002 |
| WO | WO 01/38058 | A2 | 5/2001 |
| WO | WO 2007/061193 | A1 | 5/2007 |

* cited by examiner

PLASTIC COMPOSITE PANEL WITH THE APPEARANCE AND TEXTURE SIMILAR TO NATURAL LUMBERS

This application claims the benefit of International Application Number PCT/KR/2006/004870 filed on Nov. 20, 2006 and Korean Application No. 10-2005-0114261 filed on Nov. 28, 2005, both of which are hereby incorporated by reference as if fully set forth herein.

FIELD OF THE INVENTION

The present invention relates to a novel wood plastic composite panel having the appearance and texture similar to natural lumbers, and, more particularly, to a wood plastic composite panel made of a resin composite in which wood fiber having a predetermined size is uniformly dispersed in a synthetic resin matrix and having a wood pattern formed on the surface thereof, wherein an embossed structure having a predetermined depth and a linear micro concavo-convex structure having a predetermined depth are formed together on the entire surface of the panel, thereby exhibiting the appearance and texture very similar to the cut-open surfaces of natural lumbers.

BACKGROUND OF THE INVENTION

Building materials using natural lumbers have a problem in that the original shape or texture of the building materials is easily damaged due to water or sunlight. For this reason, much research has been carried out to develop a wood plastic composite lumber that can eliminate the problem of the natural lumbers. The wood plastic composite lumber is manufactured by mixing granular or pellet-shaped wood fiber and synthetic resin at a predetermined mixing ratio, adding various additives according to the use of products, and forming the mixture into the shape of a panel using extrusion or injection.

In the wood plastic composite panel manufactured as described above, however, the synthetic resin, which is a matrix component of the resin composite, constitutes an outer layer on the surface of the panel after the extrusion. As a result, the appearance and texture peculiar to the natural lumbers are not provided due to the oil-like tactile sensation and high gloss peculiar to the plastic although the wood fibers are used as a filler. Consequently, various attempts have been made to solve the problems of the wood plastic composite panel.

Specifically, several attempts have been made to provide the inherent appearance or surface texture of the natural lumbers to the wood plastic composite panel. For example, a method of performing extrusion using pigment having different colors, a method of manually processing a wood pattern, a method of transferring or printing a wood pattern, and a method of laminating films having a wood pattern of natural lumbers or artificial materials have been usually used. However, these methods generally have problems in that the manufacturing process is very complicated, and, in some cases, the durability of products is lowered.

In order to solve the above-mentioned problems, there has been proposed a method of forming an embossed structure on the surface of the wood plastic composite panel so as to directly provide a wood pattern to the surface of the wood plastic composite panel. This method omits the aforesaid post-processing operation, and therefore, it is possible to manufacture a wood plastic composite panel having high durability with the reduction of manufacturing costs. Although the wood plastic composite panel manufactured by this method exhibits wood pattern maximally similar to the cut-open surface of the natural lumber, the wood plastic composite panel has high gloss, and, when a user touches the wood plastic composite panel, oil-like tactile sensation peculiar to the synthetic resin is felt by the user. As a result, the provision of luxury appearance and texture of the natural lumber is limited although the provision of the wood pattern is possible.

There has been also proposed a method of using large-sized wood fiber having a size of approximately 40 to 60 meshes as a filler so as to increase the percentage of the wood fiber directly exposed to the surface of the panel, and thus, to provide the texture of the natural lumber. However, the coupling force of the wood fiber is decreased with the increase in size of the wood fiber, and therefore, the strength of the panel is lowered. Also, the wood fiber is irregularly exposed to the surface of the panel, and therefore, the tactile sensation is decreased.

In the case of a natural lumber panel manufactured by directly processing a natural lumber, the natural lumber panel exhibits excellent appearance and texture after the surface of the manufactured natural lumber panel is smoothly processed. Consequently, a high-quality natural lumber panel, the surface of which has been sophisticatedly treated, is usually used for interior and exterior decorations of buildings. The surface-treated natural lumber panel has a beautiful wood pattern, a smooth and soft tactile sensation, and appropriate gloss. As a result, it is possible to ideally represent the wood pattern. This is accomplished by the unique physical properties of a cellulose polymer constituting the lumber and complex actions of the natural lumber tissues.

When the surface of a wood plastic composite lumber is smoothly treated in the same manner as the natural lumber, on the other hand, the wood plastic composite lumber exhibits high gloss and oil-like tactile sensation peculiar to the synthetic resin. Consequently, there is very high necessity of a technology for providing the appearance and texture similar to the cut-open surface of a natural lumber with the reduction of manufacturing costs although a resin composite including synthetic resin and wood fiber is used as a material.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when a resin composite including wood fiber having a predetermined size is used as a raw material, and when an embossed structure of a lumber cut-open pattern having a predetermined depth and a linear micro concavo-convex structure having a predetermined depth are formed on the surface of a panel, the panel exhibits the appearance and texture corresponding to cut-open surfaces of natural lumbers although the panel has a surface structure different from the cut-open surfaces of the natural lumbers. The present invention has been completed based on these findings.

In accordance with the present invention, the above and other objects can be accomplished by the provision of a wood plastic composite panel made of a resin composite in which wood fiber having a size of 80 to 300 meshes is included in a synthetic resin matrix, the wood plastic composite panel being provided at the entire surface thereof with an embossed structure of a lumber cut-open pattern having an average depth of 200 to 900 μm and a linear micro concavo-convex structure having an average depth of 10 to 500 μm, the panel having a reflection rate of 10 to 50% when light is incident on the surface of the panel at an incidence angle of 60 degrees.

The wood plastic composite panel according to the present invention has excellent strength and durability as compared with a natural wood panel. Furthermore, it can be confirmed from examples and comparative examples, which will be described below, that the wood plastic composite panel according to the present invention exhibits the appearance and texture very similar to those of cut-open surfaces of natural lumbers as compared with conventional wood plastic composite panels.

The resin composite, which is used as a material for the wood plastic composite panel, includes synthetic resin as a matrix component and wood fiber as a filler. The synthetic resin is not particularly restricted so long as the synthetic resin is a polymer resin that has high compatibility with the wood fiber and has high strength and durability. Preferably, a polyolefin-based polymer resin, such as polyethylene, polypropylene, and polystyrene, may be used as the synthetic resin.

The wood fiber includes wood powder obtained by pulverizing a natural lumber or a recycled wood into the form of a granule or a pellet and short fiber obtained by cutting other kinds of natural fiber (for example, hemp, flex, jute, kenaf, cellulose, etc.) into a predetermined length. The wood fiber may have approximately 20 to 80% by weight, preferably 30 to 50% by weight, on the basis of the total weight of the resin composite, although the weight percent of the wood fiber may be changed depending upon the use of the wood plastic composite panel. However, when the content of the wood fiber is too small, the content of the synthetic resin is relatively increased, and therefore, it is difficult to provide the appearance or the texture corresponding to the natural lumber. When the content of the wood fiber is too large, on the other hand, the content of the synthetic resin is relatively decreased, and therefore, the coupling force of the wood fiber is reduced. Consequently, it is difficult to provide the strength and the durability to a desired degree.

The wood fiber has a size of 80 to 300 meshes, as defined above, preferably 90 to 150 meshes. When the size of the wood fiber is too large, the strength of the panel is decreased, and the surface of the panel is very rough, whereby it is not possible to provide luxury appearance or texture corresponding to those of the cut-open surfaces of natural lumbers. When the size of the wood fiber is too small, on the other hand, the distribution of the wood fiber in the resin composite is not uniform. Especially, it is not possible to provide a wood plastic composite panel exhibiting desired appearance and texture although the panel has the embossed structure and the micro concavo-convex structure, which will be described below in more detail.

Various components may be added to the resin composite depending upon the use of the panel.

Typically, a pigment may be added to the resin composite such that various colors can be provided for kinds of lumber. Preferably, an inorganic pigment is added to the resin composite because the possibility of discoloration thereof due to sunlight is low, and therefore, the inherent color thereof is maintained for a long time. The pigment may be used alone. According to circumstances, however, a combination including two or more pigments may be used to represent various colors.

The embossed structure of the lumber cut-open pattern having the predetermined depth and the linear micro concavo-convex structure having the predetermined depth are formed together at the surface of the wood plastic composite panel according to the present invention, whereby the panel exhibits the appearance and texture corresponding to the cut-open surface of the natural lumber through complex actions of the embossed structure, the linear micro concavo-convex structure, and the wood powder in the resin composite.

When a natural lumber is cut into the form of a panel, a pattern ("a lumber cut-open pattern") peculiar to the natural lumber, such as grain and annular rings, appears on the surface of the panel. The embossed structure has a pattern corresponding to the lumber cut-open pattern. In addition, the embossed structure according to the present invention has the predetermined depth, and therefore, the embossed structure serves to exhibit the appearance and texture corresponding to the cut-open surface of the natural lumber together with the linear micro concavo-convex structure. Specifically, it has been proved that, when only the embossed structure of the lumber cut-open pattern is formed at the surface of the panel, the panel completely exhibits a beautiful pattern of the natural lumber. However, it has been proved that the physical properties of the synthetic resin constituting the resin composite appear on the surface of the panel, and therefore, the panel does not provide the unique physical properties, especially the texture, of the natural lumber. It has been proved that, when only the linear micro concavo-convex structure is formed at the surface of the panel, on the other hand, it is possible to greatly weaken unique physical properties of the synthetic resin; however, it is not possible to provide the unique physical properties, especially the beautiful appearance, of the natural lumber. Furthermore, it has been proved that the embossed structure and the linear micro concavo-convex structure provide effects sought by the present invention, when the embossed structure and the linear micro concavo-convex structure satisfy the following specific conditions.

According to the present invention, the embossed structure of the lumber cut-open pattern having an average depth of 200 to 900 μm, preferably 500 to 600 μm, and the linear micro concavo-convex structure having an average depth of 10 to 500 μm, preferably 200 to 300 μm, are formed together at the surface of the wood plastic composite panel. The size of the embossed structure and the micro concavo-convex structure must be decided for the panel to have a reflection rate of 10 to 50%, preferably 10 to 30%, when light is incident on the surface of the panel at an incidence angle of 60 degrees. According to the present invention, the embossed structure having the specific depth and the micro concavo-convex structure having the specific depth are formed together at the surface of the panel such that the panel has the specific reflection rate, whereby the panel exhibits the appearance and texture comparable with the cut-open surface of the natural lumber.

The embossed structure may be formed at the surface of the panel, for example, by pressing a heated embossing roll on the surface of the panel. When the depth of the embossed structure is too small or too large, the distance between protrusions of the embossed structure is too narrow or too wide. As a result, the oil-like tactile sensation of the synthetic resin is increased, and the light reflection rate at the surface of the panel is increased. Consequently, the panel cannot exhibit the appearance and texture of the natural lumber.

The micro concavo-convex structure may be formed by sand blasting and brushing. Specifically, the micro concavo-convex structure is formed by removing some of the synthetic resin layer from the surface of the panel so as to expose the wood powder to the surface of the panel and by forming small-sized grooves in the surface of the panel. When the depth of the micro concavo-convex structure is too small, the oil-like tactile sensation of the synthetic resin is not sufficiently eliminated. When the depth of the micro concavo-convex structure is too large, on the other hand, the embossed structure of the lumber cut-open pattern is excessively damaged.

The micro concavo-convex structure is formed at the surface of the panel in a linear shape, unlike the embossed structure of the lumber cut-open pattern. Preferably, the micro concavo-convex structure may be formed at the surface of the panel in parallel with the grain of the lumber cut-open pattern.

When the light reflection rate obtained by the embossed structure and the micro concavo-convex structure is too large, gloss of the panel is increased, and therefore, it is difficult to provide the appearance corresponding to the natural wood panel. When the depth of the embossed structure and the micro concavo-convex structure is large, on the other hand, it is possible to obtain small light reflection rate; however, the surface roughness of the panel is excessively increased, which damages the texture of the panel.

The wood plastic composite panel according to the present invention may be manufactured in various manners. For example, the embossed structure and the micro concavo-convex structure may be successively formed at the surface of a panel produced by extruding a resin composite. According to circumstances, the extruded panel may be cut into a predetermine size, and then the embossed structure and the micro concavo-convex structure may be formed at the surface of the panel through a post-processing operation. Alternatively, it is possible that the embossed structure is formed at the surface of a panel produced by extrusion, the panel is cut into a predetermined size, and the micro concavo-convex structure is formed at the surface of the panel through a post-processing operation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
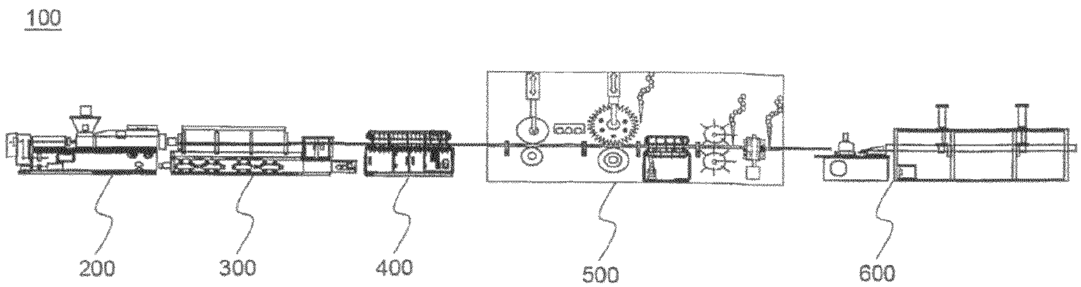
FIGS. 1 and 2 are typical views illustrating an exemplary apparatus for manufacturing a wood plastic composite panel according to the present invention.

FIG. 1 is a typical view illustrating a process for manufacturing a wood plastic composite panel according to the present invention as a process successive to an extrusion process, not a post-processing operation.

Referring to FIG. 1, an apparatus 100 for manufacturing a wood plastic composite panel includes an extruding unit 200 for extruding a resin composite to manufacture the resin composite into the form of a panel, a cooling unit 300 for cooling the extruded panel, a withdrawing unit 400 for withdrawing the cooled panel from the cooling unit such that the panel can be transferred to a subsequent stage, a surface treatment unit 500 for performing an embossing process and a brushing process on the surface of the panel, and a cutting unit 600 for cutting the surface-treated panel into a predetermined size and form.

The extruding unit 200, the cooling unit 300, the withdrawing unit 400, and the cutting unit 600 are identical to or very similar to the ones of the conventional art. Accordingly, only the surface treatment unit 500 will be described below in detail with reference to FIG. 2.

Figure 2:
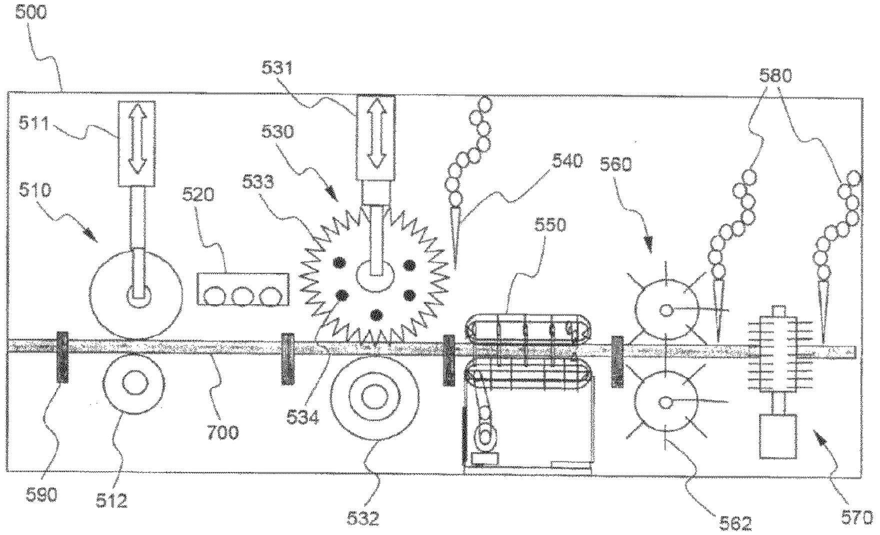

Referring to FIG. 2, the surface treatment unit 500 includes a driving roll 510 for uniformly maintaining the transfer of a panel 700, a preheating part 520 for heating the panel 700 to a predetermined temperature level, an embossing roll 530 for performing an embossing process, a cooling-purpose compressed air injection part 540 for cooling the heated panel 700, a guide roll 550 for restraining the deformation of the panel, a pair of first brushing rolls 560 for performing a brushing process on the upper and lower surfaces of the panel 700, a pair of second brushing rolls 570 for performing a brushing process on the opposite side surfaces of the panel 700, a compressed air injection part 580 for removing powder, which remains on the outer surface of the panel 700 after performing the brush process, from the panel 700, and a plurality of side rotating rolls 590 contacting the sides of the panel 700 and having vertical rotation shafts for guiding the movement of the panel 700.

Above the driving roll 510 and the embossing roll 530 are mounted pressure control parts 511 and 531, respectively, by which the driving roll 510 and the embossing roll 530 contact one surface of the panel 700 while the driving roll 510 and the embossing roll 530 are pressed to a predetermined pressure. At the opposite surface of the panel 700 are positioned supporting rolls 512 and 532.

The embossing roll 530 heats the panel 700 through a small contact interface, whereas the preheating part 520 is constructed in a surface heating structure. Consequently, the preheating part 520 has more excellent heating efficiency than the embossing roll 530. Preferably, the preheating part 520 is a non-contact type infrared heater as shown in the drawing.

The embossing roll 530 is a heating type roll. The embossing roll 530 is provided at the surface thereof with an embossed carving and depressed carving set 533 having a shape corresponding to a lumber cut-open pattern. Also, the embossing roll 530 has a plurality of electric-type heating rods 534 mounted in the rotation shaft direction of the roll. Heating oil heated by the heating rods 534 is circulated in the interior of the roll to uniformly maintain the temperature of the entire roll.

The panel 700, on which the embossing process has been performed by the embossing roll 530, is in a heated state. Consequently, the panel 700 is cooled by air injected from the compressed air injection part 540 such that a subsequent process, i.e., a brushing process, can be performed.

During the heating and cooling of the panel 700, residual heat partially remains in the panel 700. Furthermore, the panel 700 is pressed by the embossing roll 530. As a result, heat stress remains in the panel 700, which may deform the panel 700. For example, the heat stress may bend the panel 700. For this reason, the heat stress remaining in the panel 700 is eliminated by the guide roll 550, and therefore, the deformation of the panel 700 is restrained.

The structure of the first brushing rolls 560 is fundamentally identical to that of the second brushing rolls 570. For example, the first brushing rolls 560 are constructed in a structure in which pluralities of iron brushes 562 are formed at the outer surfaces of the first brushing rolls 560.

Hereinafter, examples of the present invention will be described in detail. It should be noted, however, that the scope of the present invention is not limited by the illustrated examples.

Example 1

100 parts by weight of polyethylene as a matrix component, 85 parts by weight of needle-leaf tree wood powder having approximately 100 meshes as a filler, 5 parts by weight of iron oxide (red) as an inorganic pigment, 5 parts by weight of a lubricant, and 10 parts by weight of a coupling agent were introduced into the extruding unit 200 of FIG. 1 through a hopper, were melted in the extruding unit 200, and were then extruded from the extruding unit 200. Subsequently, an embossing process and a micro concavo-convex structure forming process (a brushing process) were performed on the surface of an extruded panel by the surface treatment unit 500. Subsequently, the surface-treated panel was cut into a predetermined size by the cutting unit 600. In this way, a wood plastic composite panel was manufactured.

Figure 3:
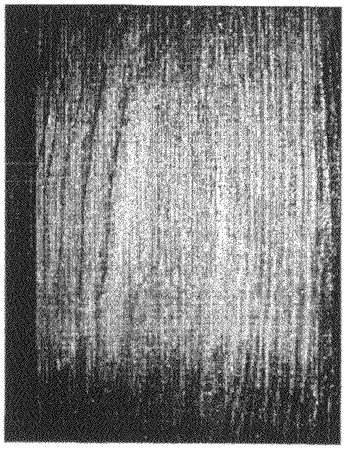
FIG. 3 is a plan-view photograph illustrating a panel having an embossed structure of a lumber cut-open pattern formed on the surface thereof according to Example 1.
Figure 4:
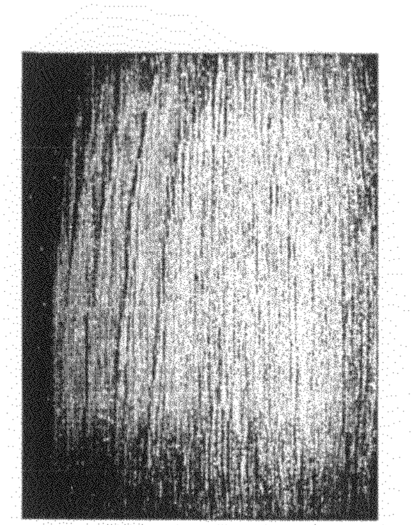
FIG. 4 is an enlarged plan-view photograph illustrating a panel having a linear micro concavo-convex structure formed on the surface thereof in addition to the embossed structure.

FIG. 3 is a plan-view photograph illustrating a panel having an embossed structure of a lumber cut-open pattern formed on the surface thereof according to the above-described manufacturing process, and FIG. 4 is an enlarged plan-view photograph illustrating a panel having a linear micro concavo-convex structure formed on the surface thereof in addition to the embossed structure. As can be seen from FIG. 4, a plurality of micro concavo-convex parts are linearly formed on the lumber cut-open pattern in the direction parallel with the lumber cut-open pattern.

Figure 5:
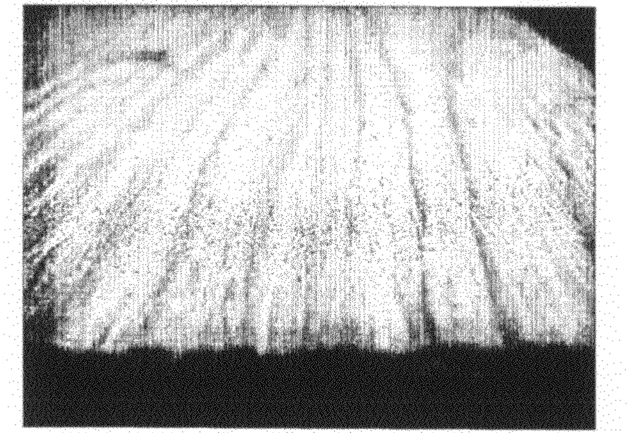
FIGS. 5 and 6 are a plan-view photograph and an enlarged sectional-view photograph respectively illustrating a wood plastic composite panel manufactured according to Example 1 when the wood plastic composite panel is photographed from the side.
Figure 6:
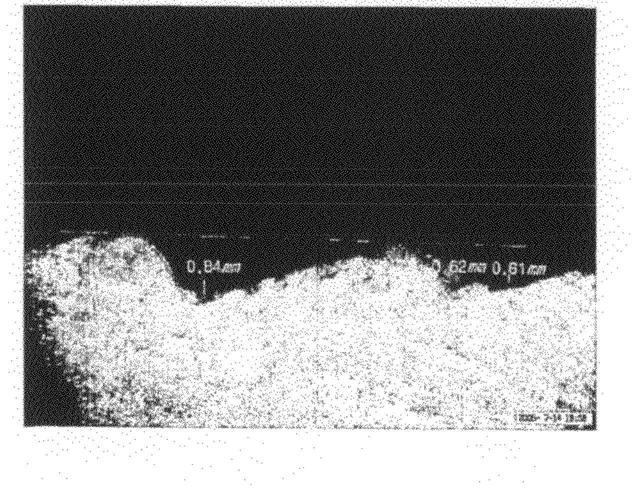

FIGS. 5 and 6 are a plan-view photograph and an enlarged sectional-view photograph respectively illustrating a wood plastic composite panel which was finally manufactured when the wood plastic composite panel is photographed from the side. As can be seen from FIG. 5, the linearly micro concavo-convex structure is formed along the embossed structure of the lumber cut-open pattern. It can be confirmed from FIG. 6 that this embossed structure has a depth of approximately 600 to 850 μm. Of course, the depth of the embossed structure may be appropriately adjusted depending to the process conditions.

Figure 7:
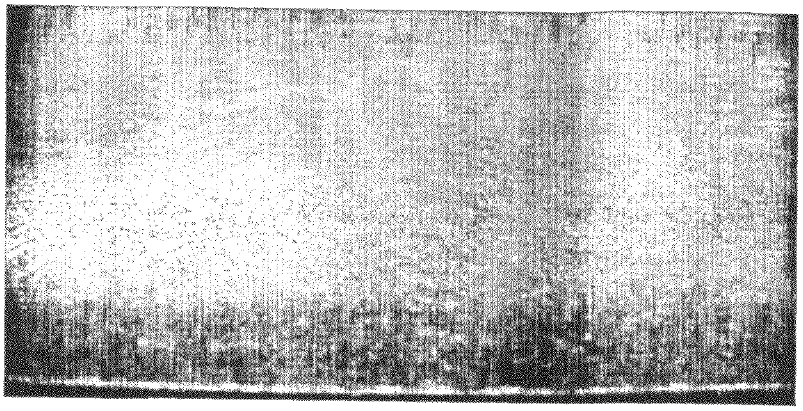
FIGS. 7 and 8 are photographs respectively illustrating the surface of a panel before and after a linear micro concavo-convex structure is formed on the surface of the panel without an embossed structure of a lumber cut-open pattern being formed on the surface of the panel.
Figure 8:
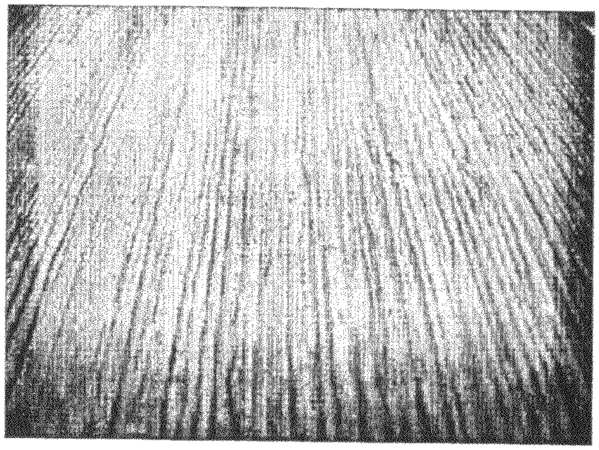
Figure 9:
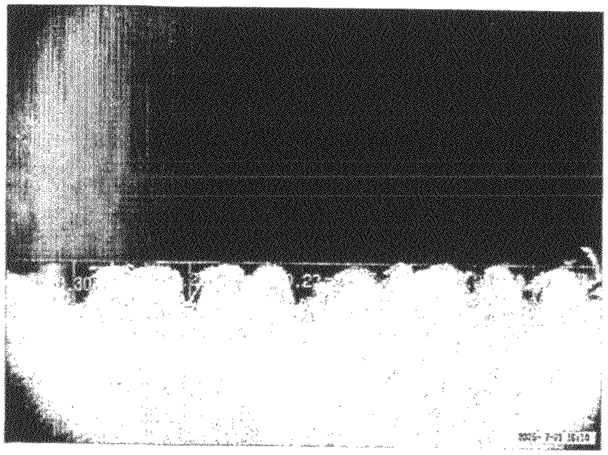
FIG. 9 is an enlarged sectional-view photograph of FIG. 8.

The shape and the size of the linear micro concavo-convex parts formed at the surface of the panel are more clearly shown in FIGS. 7 and 8, which are photographs respectively illustrating the surface of the panel before and after the linear micro concavo-convex structure is formed on the surface of the panel without the embossed structure of the lumber cut-open pattern being formed on the surface of the panel. FIG. 9 is an enlarged sectional-view photograph of FIG. 8. As shown in FIG. 7, the panel has surface gloss before the micro concavo-convex structure is formed on the surface of the panel. It can be confirmed from FIG. 8, on the other hand, that the panel does not have surface gloss after the linear micro concavo-convex structure is formed on the surface of the panel. In addition, oil-like tactile sensation peculiar to synthetic resin is greatly decreased due to the linear micro concavo-convex structure. However, it can be seen that this panel is different in overall appearance from natural lumbers. As shown in FIG. 9, the micro concavo-convex parts have a depth of approximately 100 to 350 μm. The depth of the embossed structure may be appropriately adjusted depending to the process conditions.

Comparative Example 1

A wood plastic composite panel was manufactured in the same manner as Example 1 except that needle-leaf tree wood powder having approximately 50 meshes was used as a filler, and only an embossing process was performed on the surface of the panel.

Figure 10:
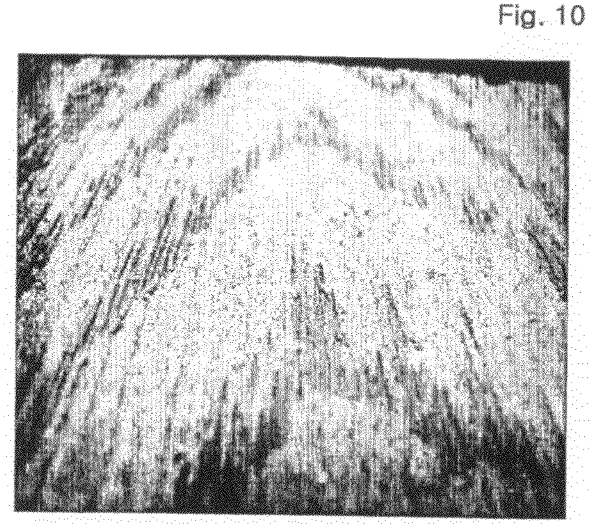
FIGS. 10 and 11 are a plan-view photograph and an enlarged sectional-view photograph of a wood plastic composite panel manufactured according to Comparative Example 1.
Figure 11:
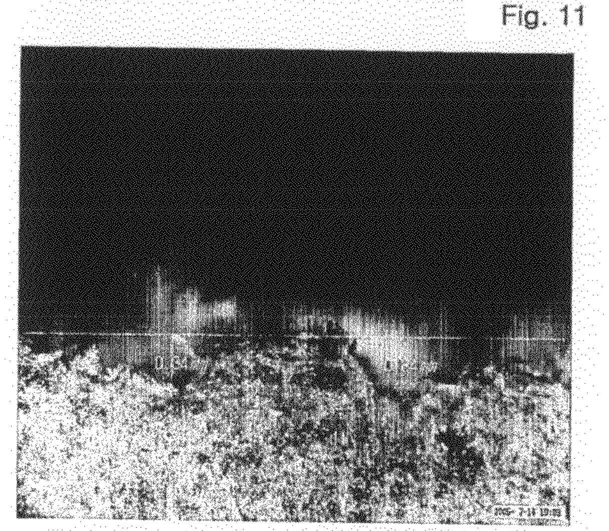

FIGS. 10 and 11 are a plan-view photograph and an enlarged sectional-view photograph of the wood plastic composite panel manufactured according to Comparative Example 1. As can be seen from these photographs, the exposure of the wood powder to the surface of the panel is very irregular and rough due to the use of wood powder having a relatively large size, and therefore, the panel does not exhibit luxury appearance and texture of the cut-open surfaces of natural lumbers. Also, it can be seen that the wood pattern of the panel does not provide a cubic effect although the depth of the embossed structure is approximately 350 μm.

Comparative Example 2

A wood plastic composite panel was manufactured in the same manner as Example 1 except that needle-leaf tree wood powder having approximately 70 meshes was used as a filler, and only a micro concavo-convex structure forming process was performed on the surface of the panel.

Figure 12:
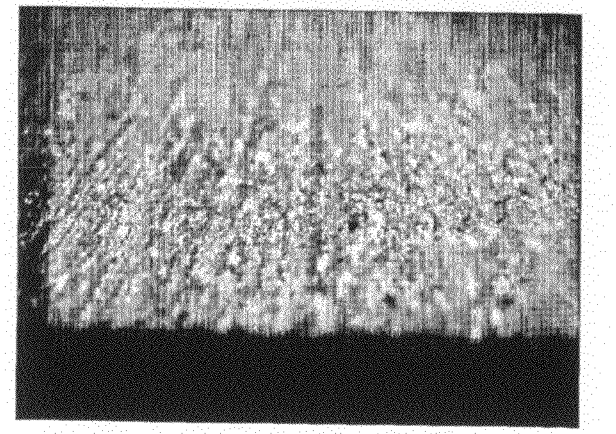
FIGS. 12 and 13 are a plan-view photograph and an enlarged sectional-view photograph of a wood plastic composite panel manufactured according to Comparative Example 2.
Figure 13:
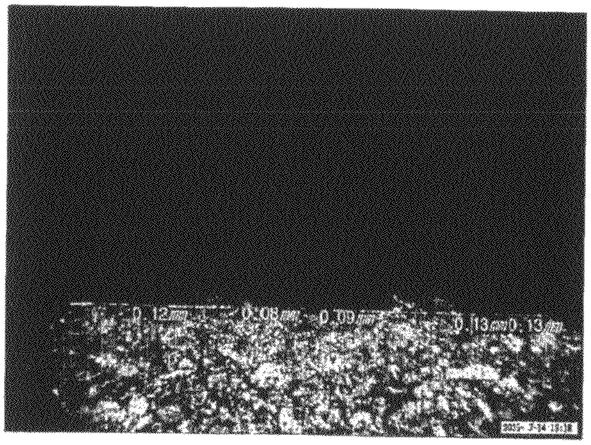

FIGS. 12 and 13 are a plan-view photograph and an enlarged sectional-view photograph of the wood plastic composite panel manufactured according to Comparative Example 2. As can be seen from these photographs, the exposure of the wood powder to the surface of the panel is very irregular and rough due to the use of wood powder having a relatively large size, and therefore, the panel does not exhibit luxury appearance and texture of the natural lumbers. Also, it can be seen that the surface of the panel is not smooth although the depth of the micro concavo-convex structure is approximately 80 to 130 μm.

Comparative Example 3

A wood plastic composite panel was manufactured in the same manner as Example 1 except that needle-leaf tree wood powder having approximately 90 meshes was used as a filler, and only a micro concavo-convex structure forming process was performed on the surface of the panel.

Figure 14:
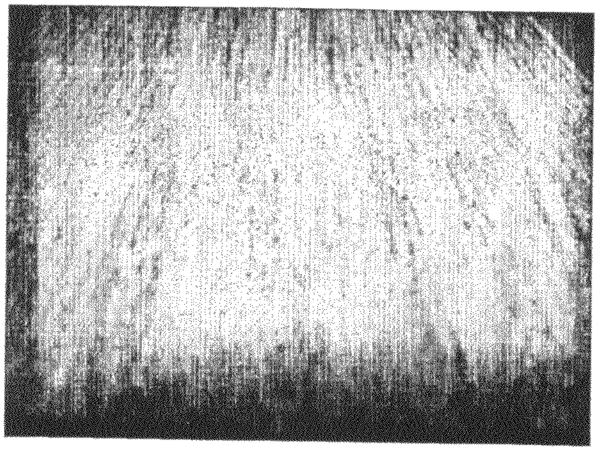
FIGS. 14 and 15 are a plan-view photograph and an enlarged sectional-view photograph of a wood plastic composite panel manufactured according to Comparative Example 3.
Figure 15:
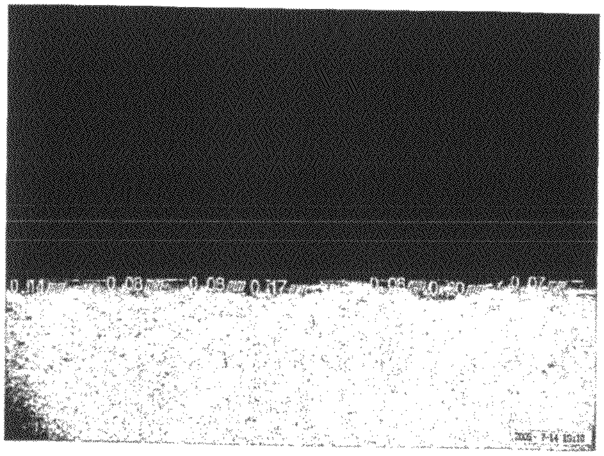

FIGS. 14 and 15 are a plan-view photograph and an enlarged sectional-view photograph of the wood plastic composite panel manufactured according to Comparative Example 3. As can be seen from these photographs, the surface of the panel is smooth due to the use of wood powder having a relatively small size; however, the panel does not exhibit the appearance and texture corresponding to the cut-open surfaces of the natural lumbers. Also, it can be seen that the panel has high gloss, and therefore, the panel mainly exhibits the physical properties of synthetic resin.

Comparative Examples 4 to 7

A wood plastic composite panel was manufactured in the same manner as Example 1 except that needle-leaf tree wood powder having approximately 100 meshes was used as a filler, and only an embossing process was performed on the surface of the panel while the temperature, the pressure, and the rotating speed of the embossing roll were changed. The conditions of the embossing process are indicated in Table 1 below.

Examples 2 to 4

A micro concavo-convex structure forming process was further performed on the surface of the wood plastic composite panel manufactured according to Comparative Example 5 at a speed of 300 rpm while the length and thickness of the iron brushes of the brushing rolls of FIG. 1 were changed. The conditions of the micro concavo-convex structure forming process are indicated in Table 2 below.

Experimental Example 1

Light was incident on 12 arbitrary spots within the same area at the surface of the wood plastic composite panel manufactured according to Comparative Examples 4 to 7 at an incidence angle of 60 degrees so as to measure the reflection rate. In addition, 10 persons were informed that estimation values of 5.0 were given with respect to the appearance and texture of a natural lumber (cherry tree) panel, and were ordered to decide relative estimation values with respect to the wood plastic composite panels manufactured according to Comparative Examples 4 to 7 and Examples 2 to 4. The results are indicated in Tables 1 and 2 below.

TABLE 1

| | Embossing Temp (° C.) | Embossing Pres. (bar) | Embossing Rpm | Average reflection rate (%) (final value: average) | | | | | | | | | | | | | Estimation on surface texture (average) |
|---|---|---|---|---|---|---|---|---|---|---|---|---|---|---|---|---|---|
| Comparative Example 4 | 150 | 3 | 50 | 20 | 19 | 20 | 19 | 19 | 21 | 19 | 21 | 22 | 20 | 19 | 18 | (19.75) | 3.8 |
| Comparative Example 5 | 150 | 3 | 100 | 44 | 31 | 40 | 38 | 31 | 34 | 25 | 28 | 33 | 38 | 42 | 41 | (35.42) | 3.3 |
| Comparative Example 6 | 180 | 5 | 50 | 23 | 25 | 22 | 21 | 24 | 24 | 27 | 23 | 24 | 25 | 23 | 24 | (23.75) | 3.5 |
| Comparative Example 7 | 180 | 5 | 100 | 24 | 22 | 22 | 22 | 22 | 24 | 22 | 23 | 25 | 23 | 22 | 24 | (22.92) | 3.6 |

As can be seen from Table 1, the wood plastic composite panels having the embossed structure formed at the surface thereof generally had a reflection rate (a gloss degree) of approximately 19 to 35%, although the reflection rate was slightly different depending upon the conditions of the embossing process. Consequently, the reflection rate of the wood plastic composite panels was approximate to the reflection rate of natural lumbers, which is 10 to 20%. However, the degree of satisfaction with respect to the appearance and the texture, such as the surface tactile sensation, of the wood plastic composite panels was approximately 65 to 75% of the natural wood panel. Consequently, the wood plastic composite panels did not overcome the limit of the synthetic resin used as the raw material.

TABLE 2

| | Thickness of iron brushes (mm) | Length of iron brushes (mm) | Average reflection rate (%) (final value: average) | | | | | | | | | | | | | Synthetic estimation on surface texture |
|---|---|---|---|---|---|---|---|---|---|---|---|---|---|---|---|---|
| Example 2 | 0.3 | 25 | 22 | 24 | 26 | 28 | 20 | 26 | 25 | 31 | 27 | 26 | 19 | 23 | (24.7) | 4.8 |
| Example 3 | 0.2 | 50 | 15 | 17 | 15.5 | 18 | 23 | 17 | 24 | 17 | 22 | 19 | 24 | 20.6 | (19.3) | 4.9 |
| Example 4 | 0.3 | 50 | 15 | 24 | 30 | 19 | 16 | 18 | 20 | 24 | 28 | 25 | 26 | 24.9 | (22.5) | 4.8 |

As can be seen from Table 2, when the linear micro concavo-convex structure was formed at the surface of the wood plastic composite panel manufactured according to Comparative Example 5, which exhibited the highest reflection rate in Table 1, the reflection rate was generally further decreased, although the reflection rate was slightly different depending upon the conditions of the micro concavo-convex structure forming process. Especially, the degree of satisfaction with respect to the surface texture of the wood plastic composite panel was approximately 95% or more of the natural wood panel. Consequently, the degree of satisfaction was very high.

INDUSTRIAL APPLICABILITY

As apparent from the above description, the wood plastic composite panel according to the present invention has excellent strength and durability. Furthermore, the wood plastic composite panel according to the present invention exhibits excellent appearance and texture comparable with cut-open surfaces of natural lumbers although the panel has a surface structure different from the cut-open surfaces of the natural lumbers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wood plastic composite panel made of a resin composite comprising:

wood fiber having a size of 80 to 300 meshes included in a synthetic resin matrix, an embossed structure of a lumber cut-open pattern having an average depth of 200 to 900 μm and a linear micro concavo-convex structure having an average depth of 10 to 500 μm, the lumber cut-open pattern being provided at the entire surface of the wood plastic composite panel, the linear micro concavo-convex structure being provided at the entire surface of the wood plastic composite panel, and the linear micro concavo-convex structure overlapping the lumber cut-open pattern at the entire surface of the wood plastic composite panel, wherein the wood plastic composite panel has a reflection rate of 10 to 50% when light is incident on the surface of the panel at an incidence angle of 60 degrees, the lumber cut-open pattern corresponds to the cut-open pattern of a natural lumber, and the linear micro concavo-convex structure is linearly formed on the lumber cut-open pattern in a direction parallel with the lumber cut-open pattern, wherein the embossed structure has an average depth of 500 to 600 μm, and wherein the linear micro concavo-convex structure has an average depth of 200 to 300 μm.

2. The wood plastic composite panel according to claim 1, wherein the wood fiber constitutes 20 to 80% by weight on the basis of the total weight of the resin composite.

3. The wood plastic composite panel according to claim 1, wherein the wood fiber has a size of 90 to 150 meshes.

4. The wood plastic composite panel according to claim 1, wherein the resin composite further includes one or more inorganic pigments.

5. The wood plastic composite panel according to claim 1, wherein the panel has a reflection rate of 10 to 30% when light is incident on the surface of the panel at an incidence angle of 60 degrees.

6. The wood plastic composite panel according to claim 1, wherein the micro concavo-convex structure is formed at the surface of the panel in parallel with grain of the lumber cut-open pattern.

7. The wood plastic composite panel according to claim 1, wherein the panel is manufactured by successively forming the embossed structure and the micro concavo-convex structure at the surface of a panel produced by extruding the resin composite.

* * * * *